W. S. BABCOCK.
Dumping-Wagon.
No. 11,466 — Patented Aug. 8 1854.
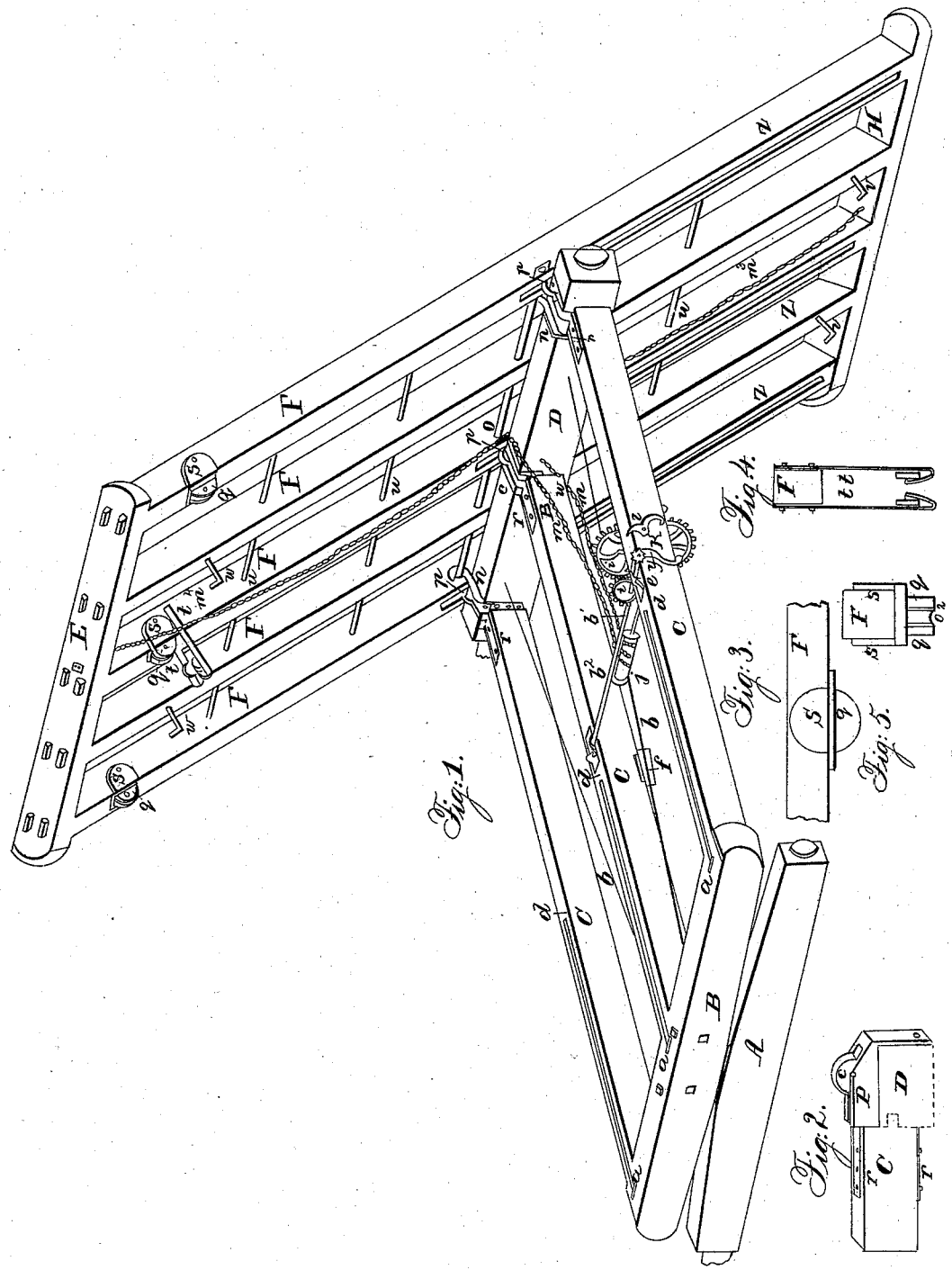

UNITED STATES PATENT OFFICE.

WILLIAM S. BABCOCK, OF STONINGTON, CONNECTICUT.

DUMPING-WAGON.

Specification of Letters Patent No. 11,466, dated August 8, 1854.

*To all whom it may concern:*

Be it known that I, WILLIAM S. BABCOCK, of Stonington, in the county of New London and State of Connecticut, have invented certain new and useful Improvements in Dumping-Wagons; and I do hereby declare that the following is a full, clear, and exact description of the same, reference being had to the accopanying drawings, forming part of this specification, in which—

Figure 1, No. 1, is a view in perspective, showing the wagon without the four running wheels with the axle cut off. No. 2, is a box or socket of cast metal, fixed to axle and reach. No. 3, is a box or socket fitted and bolted to bed timber of body. No. 4, are guide locks bolted to middle bed timber of body. No. 5, is an end view to No. 3.

Similar letters of reference indicate like parts in each of the figures.

The nature of my invention consists in so arranging a wagon as to adapt it to all uses and purposes where wagons and carts are used and by a mechanical device enable the person having it in charge to dump the load, (in any place,) easier and quicker than by any other method known.

To enable others skilled in the art, to make and use my invention, I will proceed to describe its construction and operation.

A, is the forward axle, B, rocker or bolster, C C C, reaches, connecting B, with D, rear axle, E, forward piece to body.

F F F F F, are bed timbers to body, H, rear piece to body.

$a\ a\ a$, are chocks.

$b\ b$, are two iron bolts passing through B, and D, and secured with nuts. They hold and support rack.

$d\ d\ d$, are tracks made convex to exclude gravel or dirt.

$h^1\ h^2$ are journals on which gearing is fixed.

$e\ e$, are caps to secure journals, $j$, cast iron drum on which chains wind, $k$, ratchet wheel fixed on $h^2$, $l$, catch to ratchet and secures the body when run forward, $m^3$, chain attached to $j$, passing over D, and secured to H, which chain moves the body forward, $m^4$, chain attached to $j$, passing through D, over metal pulley and secured to E. This chain moves the body back by applying the hand to crank Y.

$n\ n$, are pivot hooks, $o$, iron bolt passing through body crosswise and meshes into $n\ n$, when body is run back.

P P P, are cast iron boxes or sockets secured to C D, by straps and bolts $r$, seen in No. 2.

$c\ c\ c$, are cast iron chilled wheels running in P.

W W, are hooks passing into sockets rear side of B.

V V, are hooks passing into sockets rear side of D. These four hooks hold the body firm to rack when run forward; S S S, cast iron boxes or sockets bolted to F, $q\ q\ q$, projections for wheels concave on edge seen No. 5, $\bullet^2$ to fit track $d\ d\ d$, $t\ t$, lock guides bolted to middle F, seen in No. 4. They guide the body and keep it from dumping when the load is too far aft. They are made to let go by a wedge shaped piece S.

Z Z Z, are metal groves which run on wheels $c\ c\ c$, placed in P.

In the use of my invention the body rests on six wheels which are made of hard metal. Also the places where they rest are chilled or hardened metal to prevent wearing, all being as before represented in this specification and accompanying drawings.

When the driver or person having the wagon in charge wishes to dump the load, he applies his right hand to the crank Y, with the other let go catch, turns the crank until the body is run back, with a slight lift of his hands dumps the load. He puts the catch on $k$ and turns the crank Y opposite from before until the body is run forward to its proper place. The catch $l$ secures it firm.

The value of this wagon may be known when we consider, that it can be used in all uneven places, the gearing power being such as can be increased to any extent to move the body back and forth, which is not the case with other dumping wagons.

What I claim as my invention and desire to secure by Letters Patent, is—

1. The arrangement of the cast metal boxes or sockets P P P, with boxes or sockets S S S, containing concave wheels $\bullet^2$, the convex track $d\ d\ d$, and groved track $Z\ Z\ Z$, hooks $W\ W$, and $V\ V$.

2. I also claim the arrangement of $i\ i$, gearing, drum $j$, crank Y, ratchet $k$, chains, $m^3$, $m^4$, &c., all operating in the manner substantially as shown, and set forth in the foregoing specification and accompanying drawings.

In testimony whereof I have hereunto subscribed my name this twenty sixth day of June eighteen hundred and fifty four.

WILLIAM S. BABCOCK.

Witnesses:
CHAS. H. BRADFORD,
JOHN A. MORGAN.